US012699595B1

(12) United States Patent
Siddiqui et al.

(10) Patent No.: US 12,699,595 B1
(45) Date of Patent: Aug. 4, 2026

(54) ARTIFICIAL INTELLIGENCE BASED SYSTEM AND METHOD FOR ADAPTIVELY EXECUTING TASKS BASED ON COST DATA ANALYSIS AND BUDGETARY CONSTRAINTS

(71) Applicant: Mavvrik Inc., Austin, TX (US)

(72) Inventors: Mohammad Safiullah Siddiqui, Pflugerville, TX (US); Darmawan Suwirya, Kirkland, WA (US)

(73) Assignee: Mavvrik Inc.

( * ) Notice: Subject to any disclaimer, the term of this patent is extended or adjusted under 35 U.S.C. 154(b) by 0 days.

(21) Appl. No.: 19/576,085

(22) Filed: Mar. 24, 2026

Related U.S. Application Data

(60) Provisional application No. 63/776,328, filed on Mar. 24, 2025.

(51) Int. Cl.
*G06F 9/50* (2006.01)

(52) U.S. Cl.
CPC .................................. *G06F 9/5044* (2013.01)

(58) Field of Classification Search
CPC ........................................................ G06F 9/5044
USPC ........................................................ 718/104
See application file for complete search history.

(56) References Cited

U.S. PATENT DOCUMENTS

2007/0087756 A1* 4/2007 Hoffberg .......... G06Q 10/06375
                                                                455/450
2017/0052536 A1* 2/2017 Warner ............ G06Q 10/06312

2019/0287063 A1* 9/2019 Skaaksrud ........... G06Q 10/083
2019/0385711 A1* 12/2019 Shriberg ................ G16H 15/00
2021/0133670 A1* 5/2021 Cella ................... G06Q 10/0834
2021/0374569 A1* 12/2021 Jezewski ................ G06N 20/00
2022/0187847 A1* 6/2022 Cella ............... G05B 19/41885
2022/0291666 A1* 9/2022 Cella ................. G05B 19/4155
2023/0057008 A1* 2/2023 DiMaria ............. H04M 3/5231
(Continued)

OTHER PUBLICATIONS

Omkar Reddy Polu; AI-enhanced cloud cost optimization using predictive analytics; Publication Year: 2025.
(Continued)

*Primary Examiner* — Tuan C Dao
(74) *Attorney, Agent, or Firm* — Jason C. Cameron

(57) ABSTRACT

An artificial intelligence (AI)-based system and a method for adaptively executing tasks based on cost analysis and budgetary constraints, are disclosed. The AI-based system comprises a data obtaining subsystem, a cost estimating subsystem, a real-time cost monitoring subsystem, and an output generating subsystem. The data obtaining subsystem obtains input data including a monetary value, a token quota, a computational resource limit, textual inputs, an expected output size, Large Language Model (LLM) preference, and retrieval-augmented generation (RAG) steps. The cost estimating subsystem computes estimated cost data for each AI workflow using predefined pricing models. The real-time cost monitoring subsystem continuously monitors execution cost data of AI workflows, in real-time to dynamically adjust the executed cost data in compliance with the pre-defined budget ensuring. The output generating subsystem provides the dynamically adjusted executed cost data with real-time feedback, one or more alerts, and cost reports, ensuring transparency in task execution.

18 Claims, 9 Drawing Sheets

700

Start AI agent workflow execution 702

Begin dynamic execution flow 704

Activate real-time cost monitoring subsystem 706

Monitor token usage, inference time, AP/tool call costs 708

Is running cost within budget? 710

Yes

No

If yes: continue dynamic execution flow 712

If no: trigger flow adjustment -switch to fixed/deterministic flow 714

Apply adjusted execution parameters 716

Continue execution with adjustments 718

Complete workflow execution 720

Return final results 722

(56) References Cited

U.S. PATENT DOCUMENTS

2024/0403776 A1* 12/2024 Krishna ........... G06Q 10/06375
2025/0292023 A1    9/2025 Kuperman et al.

OTHER PUBLICATIONS

Tetrate; Cost monitoring; https://tetrate.io/learn/ai/cost-monitoring.
APIPark; Mastering AI Gateway: Enhance Performance & Security;
Publication Date: Nov. 13, 2025.
Tengxiao Liu et al; Budget-Aware Tool-Use Enables Effective
Agent Scaling; Publication Date: Nov. 21, 2025.
Rohit Sharma; Implementing Thinking Budgets: A Design Pattern
for Budget-Aware AI Agents; Publication Date: Dec. 6, 2025.

* cited by examiner

100

200

300

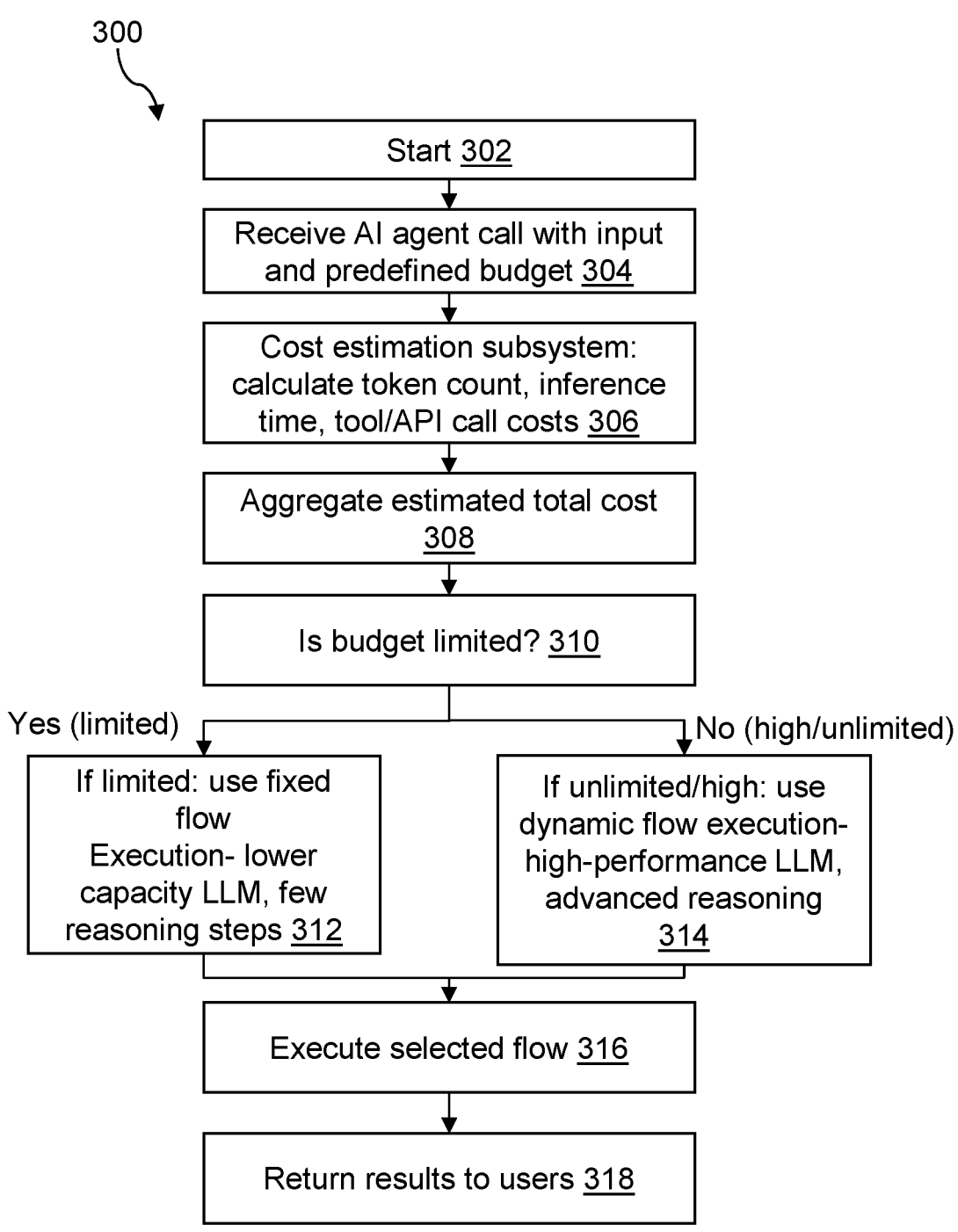

Start 302

Receive AI agent call with input
and predefined budget 304

Cost estimation subsystem:
calculate token count, inference
time, tool/API call costs 306

Aggregate estimated total cost
308

Is budget limited? 310

Yes (limited)                                    No (high/unlimited)

If limited: use fixed
flow
Execution- lower
capacity LLM, few
reasoning steps 312

If unlimited/high: use
dynamic flow execution-
high-performance LLM,
advanced reasoning
314

Execute selected flow 316

Return results to users 318

FIG. 3

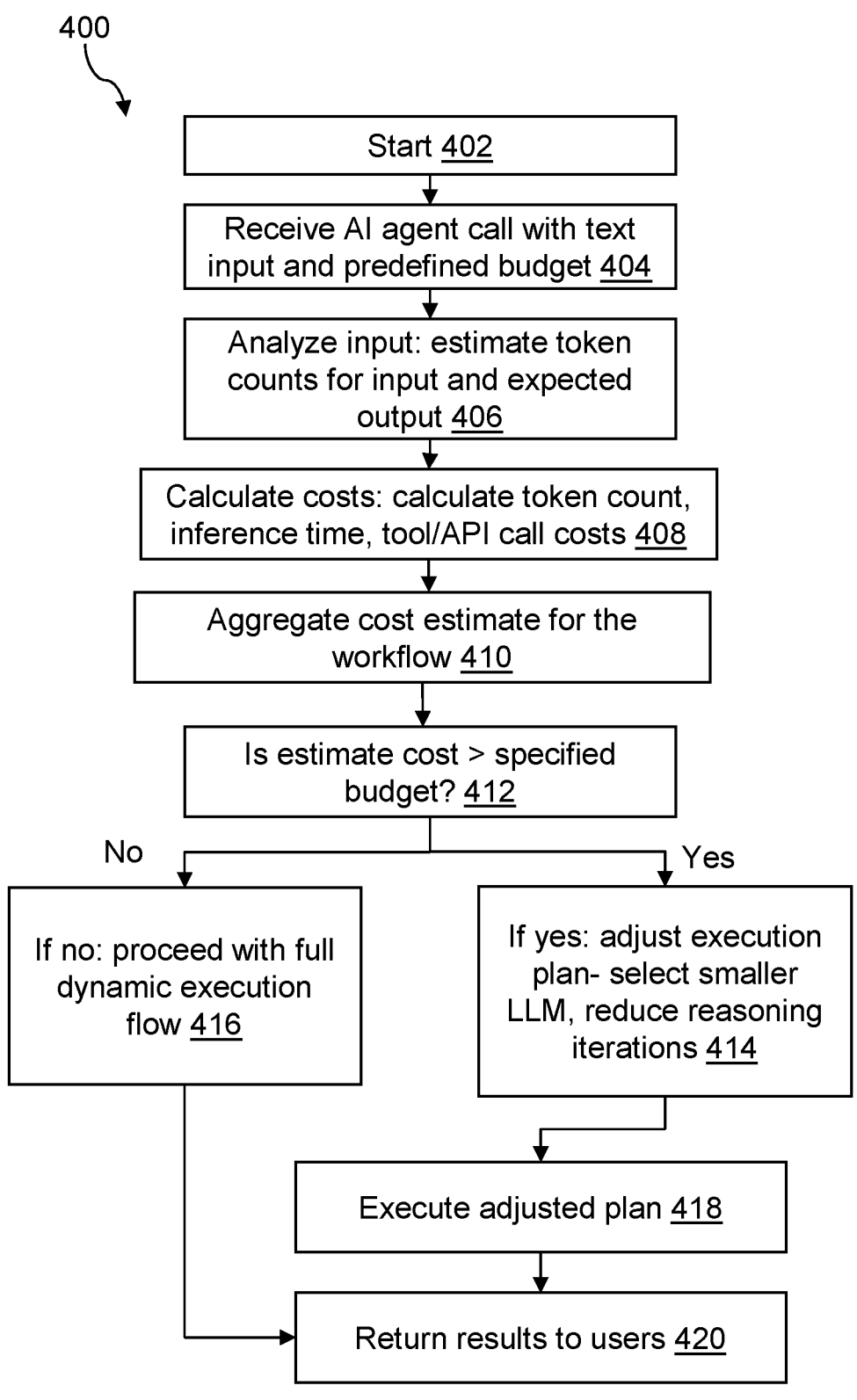

400

Start 402

Receive AI agent call with text input and predefined budget 404

Analyze input: estimate token counts for input and expected output 406

Calculate costs: calculate token count, inference time, tool/API call costs 408

Aggregate cost estimate for the workflow 410

Is estimate cost > specified budget? 412

No

Yes

If no: proceed with full dynamic execution flow 416

If yes: adjust execution plan- select smaller LLM, reduce reasoning iterations 414

Execute adjusted plan 418

Return results to users 420

OBTAIN INPUT DATA FROM ONE OR MORE COMMUNICATION DEVICES ASSOCIATED WITH ONE OR MORE USERS — 802

COMPUTE ESTIMATED COST DATA FOR EACH AI WORKFLOW OF ONE OR MORE AI WORKFLOWS USING ONE OR MORE PRE-DEFINED PRICING MODELS — 804

MONITOR EXECUTED COST DATA OF THE ONE OR MORE TASKS IN THE ONE OR MORE AI WORKFLOWS IN REAL-TIME TO DYNAMICALLY ADJUST THE EXECUTED COST DATA OF THE ONE OR MORE TASKS IN THE ONE OR MORE AI WORKFLOWS IN COMPLIANCE WITH THE PRE-DEFINED BUDGET — 806

MONITOR AT LEAST ONE OF: TOKEN USAGE, INFERENCE TIME, AND TOOL CALL EXECUTION, CORRESPONDING TO EACH AI WORKFLOW, IN REAL-TIME BASED ON THE ESTIMATED COST DATA 808

COMPARE ONE OR MORE REAL-TIME COST METRICS ASSOCIATED WITH THE EXECUTED COST DATA OF THE ONE OR MORE AI WORKFLOWS, WITH THE PRE-DEFINED BUDGET PROVIDED IN THE INPUT DATA, USING A DECISION MAKING MODULE 810

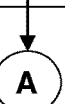

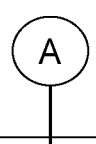

A

DETERMINE WHETHER THE EXECUTED COST DATA OF THE ONE OR MORE TASKS IN THE ONE OR MORE AI WORKFLOWS ARE COMPLIANT WITH THE BUDGET CONSTRAINTS BASED ON COMPARISON RESULTS, USING THE DECISION MAKING MODULE 812

DYNAMICALLY ADJUST ONE OR MORE EXECUTION PARAMETERS COMPRISING AT LEAST ONE OF: LLM SELECTION, TOKEN LENGTH, AND NUMBER OF REASONING ITERATIONS IN REAL-TIME, TO ADAPT THE EXECUTED COST DATA IN COMPLIANCE WITH THE PRE-DEFINED BUDGET PROVIDED IN THE INPUT DATA, USING THE DECISION MAKING MODULE 814

SELECT FIXED AND DETERMINISTIC EXECUTION FLOW USING LESS EXPENSIVE, LOWER-CAPACITY LLMS AND MINIMAL REASONING STEPS, AND REDUCE A NUMBER OF REASONING CYCLES AND EXTERNAL TOOL INTERACTIONS, USING THE DECISION MAKING MODULE WHEN THE PRE-DEFINED BUDGET IS LOW 816

ACTIVATE A DYNAMIC EXECUTION FLOW THAT LEVERAGES HIGH-PERFORMANCE LLMS, ADVANCED REASONING, AND DYNAMIC DECISION-MAKING, WHEN THE PRE-DEFINED BUDGET IS HIGH 818

FIG. 8B

ARTIFICIAL INTELLIGENCE BASED SYSTEM AND METHOD FOR ADAPTIVELY EXECUTING TASKS BASED ON COST DATA ANALYSIS AND BUDGETARY CONSTRAINTS

CROSS-REFERENCE TO RELATED APPLICATIONS

This application claims priority from provisional U.S. Application No. 63/776,328 titled ARTIFICIAL INTELLIGENCE-DRIVEN SYSTEM AND METHOD FOR ADAPTIVE TASK EXECUTION BASED ON COST DATA ANALYSIS AND BUDGETARY CONSTRAINTS, filed on Mar. 24, 2025, which is hereby incorporated by reference in its entirety.

TECHNICAL FIELD

Embodiments of the present disclosure relate to budget-aware task management systems and more particularly relate to an artificial intelligence (AI)-based system and method for adaptively executing one or more tasks in one or more AI workflows based on cost data analysis and budgetary constraints.

BACKGROUND

Artificial Intelligence (AI)-driven applications, particularly one or more Large Language Models (LLMs) and multi-agent workflows, have become increasingly sophisticated but also computationally expensive. Many modern AI systems rely on Retrieval-Augmented Generation (RAG), external Application Programming interface (API) calls, and complex inference models, which demand significant computational resources. These processes inherently involve high costs due to token consumption, processing time, and third-party service charges. As AI adoption grows across industries, organizations face challenges in managing and predicting a financial impact of running AI-based workflows, which lead to unpredictable expenses and resource inefficiencies.

Existing AI workflow management systems primarily focus on accuracy and performance rather than cost control. Prior approaches optimize for speed and output quality but may not provide built-in budgeting mechanisms. Some cloud-based AI platforms allow one or more users to monitor resource usage, but the cloud-based AI platforms lack real-time cost control mechanisms that actively adjust execution strategies based on predefined budgets. As a result, the organizations and developers face unexpected overages and inefficient resource allocation, making it difficult to scale AI applications in a cost-effective manner.

Some research efforts have attempted to reduce AI inference costs by one of: optimizing model architectures and using distillation techniques to create lightweight versions of the one or more LLMs. While these approaches assist in lowering expenses, but these approaches may not provide a comprehensive, dynamic execution strategy that actively monitors and adjusts workflows based on cost constraints. Moreover, multi-agent AI systems, which involve multiple models interacting and exchanging data, may not inherently factor in budget constraints, which may lead to excessive API calls and inefficient collaboration.

Therefore, there is a need for an improved budget-aware AI-based system and method that may dynamically monitor, estimate, and control execution costs, in order to address the aforementioned issues. Such an AI-based system should integrate real-time cost monitoring, execution adjustments, and adaptive workflows to ensure that AI processes remain within predefined budget constraints.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, an artificial intelligence (AI)-driven system or AI-based system for adaptively executing one or more tasks based on cost analysis and budgetary constraints is disclosed. The AI-based system may provide techniques for adapting AI workflows in response to user-specified budget parameters.

The AI-based method comprises obtaining, by one or more hardware processors, input data from one or more communication devices associated with one or more users. The input data comprise at least one of: a monetary value indicating a pre-defined budget, a token quota, a computational resource limit, one or more textual inputs, an expected output size, preference of one or more language models, and one or more retrieval-augmented generation (RAG) steps.

The AI-based method further comprises computing, by the one or more hardware processors, estimated cost data for each AI workflow of one or more AI workflows using one or more pre-defined pricing models. The AI-based method further comprises monitoring, by the one or more hardware processors, executed cost data of the one or more tasks in the one or more AI workflows in real-time to dynamically adjust the executed cost data of the one or more tasks in the one or more AI workflows in compliance with the pre-defined budget. For monitoring the executed cost data of the one or more tasks in the one or more AI workflows in real-time, the AI-based method further comprises: (a) monitoring, by the one or more hardware processors, at least one of: token usage, inference time, and tool call execution, corresponding to each AI workflow, in real-time based on the estimated cost data; (b) comparing, by the one or more hardware processors, one or more real-time cost metrics associated with the executed cost data of the one or more AI workflows, with the pre-defined budget provided in the input data, using a decision making module; (c) determining, by the one or more hardware processors, whether the executed cost data of the one or more tasks in the one or more AI workflows are compliant with the budget constraints based on comparison results, using the decision making module; and (d) dynamically adjusting, by the one or more hardware processors, one or more execution parameters comprising at least one of: LLM selection, token length, and number of reasoning iterations in real-time, to adapt the executed cost data in compliance with the pre-defined budget provided in the input data, using the decision making module. For dynamically adjusting the one or more execution parameters to adapt the executed cost data in compliance with the pre-defined budget, the AI-based method further comprises at least one of: (a) selecting, by the one or more hardware processors, fixed and deterministic execution flow using less expensive, lower-capacity LLMs and minimal reasoning steps, and reducing a number of reasoning cycles and external tool interactions, using the decision making module when the pre-defined budget is low; and (b) activating, by the one or more hardware processors, a dynamic execution flow that leverages high-performance LLMs, advanced reasoning, and dynamic decision-making.

In an embodiment, computing the estimated cost data for each AI workflow using the one or more pre-defined pricing models, comprises: (a) assigning, by the one or more hardware processors, at least one of: cost-per-token, cost-per-inference-time unit, and costs fixed tool call, corresponding to each AI workflow of the one or more workflows, using the one or more pre-defined pricing models; (b) analyzing, by the one or more hardware processors, the input data to estimate token counts for each AI workflow; (c) computing, by the one or more hardware processors, the estimated cost data for at least one of: RAG, Large Language Model (LLM) processing, and one or more tool and Application Programming Interface (API) calls; (d) estimating, by the one or more hardware processors, a number of tokens required for task execution, comprising both input and output token counts, for determining LLM inference costs by assessing the input data; (e) providing, by the one or more hardware processors, a breakdown of estimated cost data for one or more components comprising at least one of: cost per token and cost per API call; and (f) estimating, by the one or more hardware processors, a cost of sending messages and delegating the one or more tasks for computing the estimated cost data by analyzing at least one of: token counts, processing time, and external API usage, using an inter-agent cost estimation module configured in a cost estimating subsystem.

In another embodiment, the AI-based method further comprising providing, by the one or more hardware processors, the dynamically adjusted executed cost data, with at least one of: real-time feedback, one or more alerts, and one or more cost reports, as an output, to the one or more users through one or more user interfaces associated with the one or more communication devices of the one or more users.

In yet another embodiment, monitoring the executed cost data further comprises: (a) re-estimating, by the one or more hardware processors, remaining budget allocation for one or more subsequent steps using the decision making module through one or more feedback loops; (b) adapting, by the one or more hardware processors, dynamic selection between one or more execution flows based on the estimated cost data, using the decision-making module; and (c) providing, by the one or more hardware processors, historical cost tracking and predictive analytics for future budgeting to assist the one or more users in refining budgeting strategies for future AI operations, using the decision making module.

In yet another embodiment, the AI-based method further comprising at least one of: (a) generating, by the one or more hardware processors, the real-time feedback for the one or more users provided through the one or more user interfaces associated with the one or more communication devices, potentially suggesting one or more modifications to at least one of: the input data and the predefined budget based on the monitored cost data; (b) generating, by the one or more hardware processors, the one or more alerts when the monitored cost data exceeds the pre-defined budget, adapting the one or more users to take corrective action before budget overruns occur; (c) generating, by the one or more hardware processors, the one or more cost reports before the one or more AI workflows are executed; and (d) generating, by the one or more hardware processors, one or more logs associated with the one or more cost reports for auditing, optimization, and future cost prediction improvements, adapting financial planning for one or more subsequent task executions by one or more AI agents.

In yet another embodiment, the AI-based method further comprising automatically exchanging, by the one or more hardware processors, the estimated cost data during communications between the one or more AI agents, by: (a) offloading, by the one or more hardware processors, the one or more tasks from a first AI agent of the one or more AI agents to a second AI agent possessing lower-cost task executions, and adjust complexity of a request based on a cumulative cost estimate; (b) adapting, by the one or more hardware processors, a hierarchical cost management where a master AI agent of the one or more AI agents oversees and optimizes overall expenditure across one or more sub-AI agents; and (c) providing, by the one or more hardware processors, dynamic routing of the one or more tasks to a third AI agent possessing cost-effective task executions, to optimize performance and cost.

In an aspect, an artificial intelligence (AI)-based system for adaptively executing one or more tasks based on cost analysis and budgetary constraints, is disclosed. The AI-based system includes one or more hardware processors and a memory. The memory is coupled to the one or more hardware processors. The memory comprises a plurality of subsystems in form of programmable instructions executable by the one or more hardware processors.

The plurality of subsystems comprises a data obtaining subsystem configured to obtain input data from one or more communication devices associated with one or more users. The input data comprise at least one of: a monetary value indicating a pre-defined budget, a token quota, a computational resource limit, one or more textual inputs, an expected output size, preference of one or more language models, and one or more retrieval-augmented generation (RAG) steps.

The plurality of subsystems further comprises a cost estimating subsystem configured to compute estimated cost data for each AI workflow of one or more AI workflows using one or more pre-defined pricing models. The plurality of subsystems further comprises a real-time cost monitoring subsystem configured to monitor executed cost data of the one or more tasks in the one or more AI workflows in real-time to dynamically adjust the executed cost data of the one or more tasks in the one or more AI workflows in compliance with the pre-defined budget. For monitoring the executed cost data of the one or more tasks in the one or more AI workflows in real-time, the real-time cost monitoring subsystem is further configured to: (a) monitor at least one of: token usage, inference time, and tool call execution, corresponding to each AI workflow, in real-time based on the estimated cost data; (b) compare one or more real-time cost metrics associated with the executed cost data of the one or more AI workflows, with the pre-defined budget provided in the input data, using a decision making module; (c) determine whether the executed cost data of the one or more tasks in the one or more AI workflows are compliant with the budget constraints based on comparison results, using the decision making module; and (d) dynamically adjust one or more execution parameters comprising at least one of: LLM selection, token length, and number of reasoning iterations in real-time, to adapt the executed cost data in compliance with the pre-defined budget provided in the input data, using the decision making module.

For dynamically adjusting the one or more execution parameters to adapt the executed cost data in compliance with the pre-defined budget, the real-time cost monitoring subsystem is configured to at least one of: (a) select fixed and deterministic execution flow using less expensive, lower-capacity LLMs and minimal reasoning steps, and reducing a number of reasoning cycles and external tool interactions, using the decision making module when the pre-defined budget is low; and (b) activate a dynamic execution flow that leverages high-performance LLMs, advanced reasoning, and dynamic decision-making, when the pre-defined budget is high.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The Disclosure Will be Described and Explained with Additional Specificity and Detail with the Accompanying Figures in which:

FIG. 3 illustrates an exemplary first flow diagram representation depicting the dynamic task execution based on the budgetary constraints, in accordance with an embodiment of the present disclosure;

FIG. 4 illustrates an exemplary second flow diagram representation depicting token-based cost data estimation, in accordance with an embodiment of the present disclosure;

FIG. 8A-8B is a flowchart illustrating an AI-based method for adaptively executing the one or more tasks in the one or more AI workflows based on the cost data analysis and budgetary constraints, in accordance with an embodiment of the present disclosure.

Figure 1:
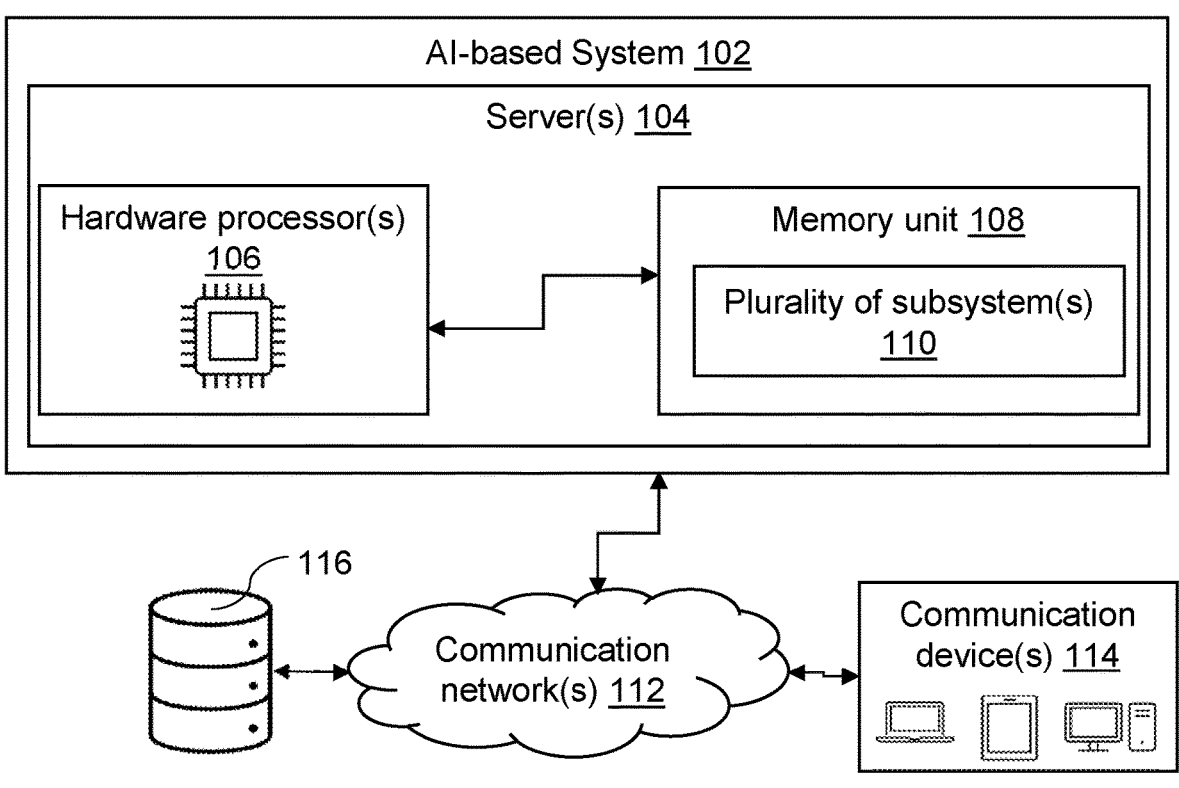
FIG. 1 illustrates an exemplary block diagram representation of a network architecture depicting an artificial intelligence (AI)-based system for adaptively executing one or more tasks in one or more AI workflows based on cost data analysis and budgetary constraints, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 8B, where similar reference characters denote corresponding features consistently throughout the figures, there are shown preferred embodiments and these embodiments are described in the context of the following exemplary system and/or method.

FIG. 1 illustrates an exemplary block diagram representation of a network architecture 100 depicting an artificial intelligence (AI)-based system 102 for adaptively executing one or more tasks in one or more AI workflows based on cost data analysis and budgetary constraints, in accordance with an embodiment of the present disclosure.

According to an exemplary embodiment of the present disclosure, the network architecture 100 may include the AI-based system 102 (hereinafter referred to as the system 102), one or more databases 116, and one or more communication devices 114. The system 102, the one or more databases 116, and the one or more communication devices 114 may be communicatively coupled via one or more communication networks 112, ensuring seamless data transmission, processing, and decision-making. The system 102 acts as a central processing unit within the network architecture 100, responsible for the dynamic task execution based on the cost data analysis and the budgetary constraints. The system 102 is configured to execute a set of computer-readable instructions that control a plurality of subsystems 110.

The system 102 is initially configured to obtain input data from the one or more communication devices 114 associated with the one or more users. The input data may include, but not restricted to, at least one of: a monetary value to define an allocated budget (predefined budget), a token quota to limit Artificial Intelligence (AI) token consumption, a computational resource limit to manage processing constraints such as one of: CPU usage and GPU usage, textual inputs provided by the one or more users, expected output size to estimate a response length, Large Language Model (LLM) preference to determine which AI agent of one or more AI agents need be utilized, external tool call parameters, ensuring that Application Programming Interface (API) interactions, retrieval-augmented generation (RAG) steps, and other dependencies are accounted for in a task execution flow, and the like. In an embodiment, the input data may be encrypted and decrypted by the system 102, so that one or more third party users cannot be authenticated to manipulate the input data.

The system 102 is further configured to compute estimated cost data for each AI workflow of one or more AI workflows using one or more pre-defined pricing models. The system 102 is further configured to monitor executed cost data of the one or more tasks in the one or more AI workflows in real-time to dynamically adjust the executed cost data of the one or more tasks in the one or more AI workflows in compliance with the pre-defined budget.

For monitoring the executed cost data of the one or more tasks in the one or more AI workflows in real-time, the system 102 is initially configured to monitor at least one of: token usage, inference time, and tool call execution, corresponding to each AI workflow, in real-time based on the estimated cost data. The system 102 is further configured to compare one or more real-time cost metrics associated with the executed cost data of the one or more AI workflows, with the pre-defined budget provided in the input data, using a decision making module. The system 102 is further configured to determine whether the executed cost data of the one or more tasks in the one or more AI workflows are compliant with the budget constraints based on comparison results, using the decision making module. The system 102 is further configured to dynamically adjust one or more execution parameters comprising at least one of: LLM selection, token length, and number of reasoning iterations in real-time, to adapt the executed cost data in compliance with the pre-defined budget provided in the input data, using the decision making module.

For dynamically adjusting the one or more execution parameters to adapt the executed cost data in compliance with the pre-defined budget, the system 102 is configured to at least one of: (a) select fixed and deterministic execution flow using less expensive, lower-capacity LLMs and minimal reasoning steps, and reducing a number of reasoning cycles and external tool interactions, using the decision making module when the pre-defined budget is low; and (b) activate a dynamic execution flow that leverages high-performance LLMs, advanced reasoning, and dynamic decision-making, when the pre-defined budget is high.

The system 102 is further configured to provide the dynamically adjusted executed cost data, with at least one of: real-time feedback, one or more alerts, and one or more cost reports, as an output, to the one or more users through one or more user interfaces associated with the one or more communication devices 114 of the one or more users.

In an embodiment, the system 102 may obtain the input data from the one or more databases 116 (i.e., one or more data sources). In an exemplary embodiment, the system 102 comprises one or more servers 104. The one or more servers 104 may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or one or more hardware processors 106.

The one or more servers 104 comprise the one or more hardware processors 106 and a memory unit 108 (otherwise referred as memory 108). The memory unit 108 is operatively connected to the one or more hardware processors 106. The memory unit 108 comprises a set of computer-readable instructions in the form of the plurality of subsystems 110, configured to be executed by the one or more hardware processors 106.

In an exemplary embodiment, the one or more hardware processors 106 may include, for example, microprocessors, microcomputers, microcontrollers, digital signal processors, central processing units, state machines, logic circuits, and/or any devices that manipulate data or signals based on operational instructions. Among other capabilities, the one or more hardware processors 106 may fetch and execute computer-readable instructions in the memory unit 108 operationally coupled with the system 102 for performing tasks such as data processing, input/output processing, and/or any other functions. Any reference to a task in the present disclosure may refer to an operation being or that may be performed on data. The one or more hardware processors 106 are high-performance processors capable of handling large volumes of data and complex computations. The one or more hardware processors 106 may be, but not limited to, at least one of: multi-core central processing units (CPU), graphics processing units (GPUs), and the like, that enhance an ability of the system 102 to process real-time data from one or more sources simultaneously.

In an exemplary embodiment, the one or more databases 116 may be configured to store and manage data related to various aspects of the system 102. The one or more databases 116 may store at least one of, but not limited to, input data, one or more Artificial Intelligence (AI) agents, any other information necessary for the functionality and optimization of the system 102, and the like. The one or more databases 116 serve as a centralized repository for critical data elements that are integral to the secure operation of the system 102, enabling efficient dynamic task execution. The one or more databases 116 enable the system 102 to dynamically retrieve, analyze, and update the stored data in real-time, for the dynamic task execution based on the cost data analysis and the budgetary constraints. The one or more databases 116 may include different types of databases such as, but not limited to, relational databases (e.g., Structured Query Language (SQL) databases such as PostgresDB and Oracle® databases), non-Structured Query Language (NoSQL) databases (e.g., MongoDB, Cassandra), time-series databases (e.g., InfluxDB), an OpenSearch database, object storage systems (e.g., Amazon® S3), and the like.

In an exemplary embodiment, the one or more communication devices 114 are configured to enable the one or more users to interact with the system 102. The one or more communication devices 114 may be digital devices, computing devices, and/or networks. The one or more communication devices 114 may include, but not limited to, a mobile device, a smartphone, a personal digital assistant (PDA), a tablet computer, a phablet computer, a wearable computing device, a virtual reality/augmented reality (VR/AR) device, a laptop, a desktop, and the like.

In an exemplary embodiment, the one or more communication devices 114 may be associated with, but not limited to, one or more service providers, one or more customers, an individual, an administrator, a vendor, a technician, a specialist, an instructor, a supervisor, a team, an entity, an organization, a company, a facility, a bot, any other user, and combination thereof. The entity, the organization, and the facility may include, but not limited to, an e-commerce company, online marketplaces, service providers, retail stores, a merchant organization, a logistics company, warehouses, transportation company, an airline company, a hotel booking company, a hospital, a healthcare facility, an exercise facility, a laboratory facility, a company, an outlet, a manufacturing unit, an enterprise, an organization, an educational institution, a secured facility, a warehouse facility, a supply chain facility, any other facility/organization and the like.

In an exemplary embodiment, the one or more communication networks 112 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fiber optic network, a satellite network, a cloud computing network, a combination of networks, and the like. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth®, ZigBee®, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the system 102 may be implemented by way of a single device or a combination of multiple devices that may be operatively connected or networked together. The system 102 may be implemented in hardware or a suitable combination of hardware and software.

Though few components and the plurality of subsystems 110 are disclosed in FIG. 1, there may be additional components and subsystems which is not shown, such as, but not limited to, ports, routers, repeaters, firewall devices, network devices, the one or more databases 116, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the system 102, and the one or more communication devices 114 connected to the one or more databases 116, one skilled in the art can envision that the system 102, and the one or more communication devices 114 may be connected to several user devices located at various locations and several databases via the one or more communication networks 112.

Those of ordinary skilled in the art will appreciate that the hardware depicted in FIG. 1 may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

Figure 2:
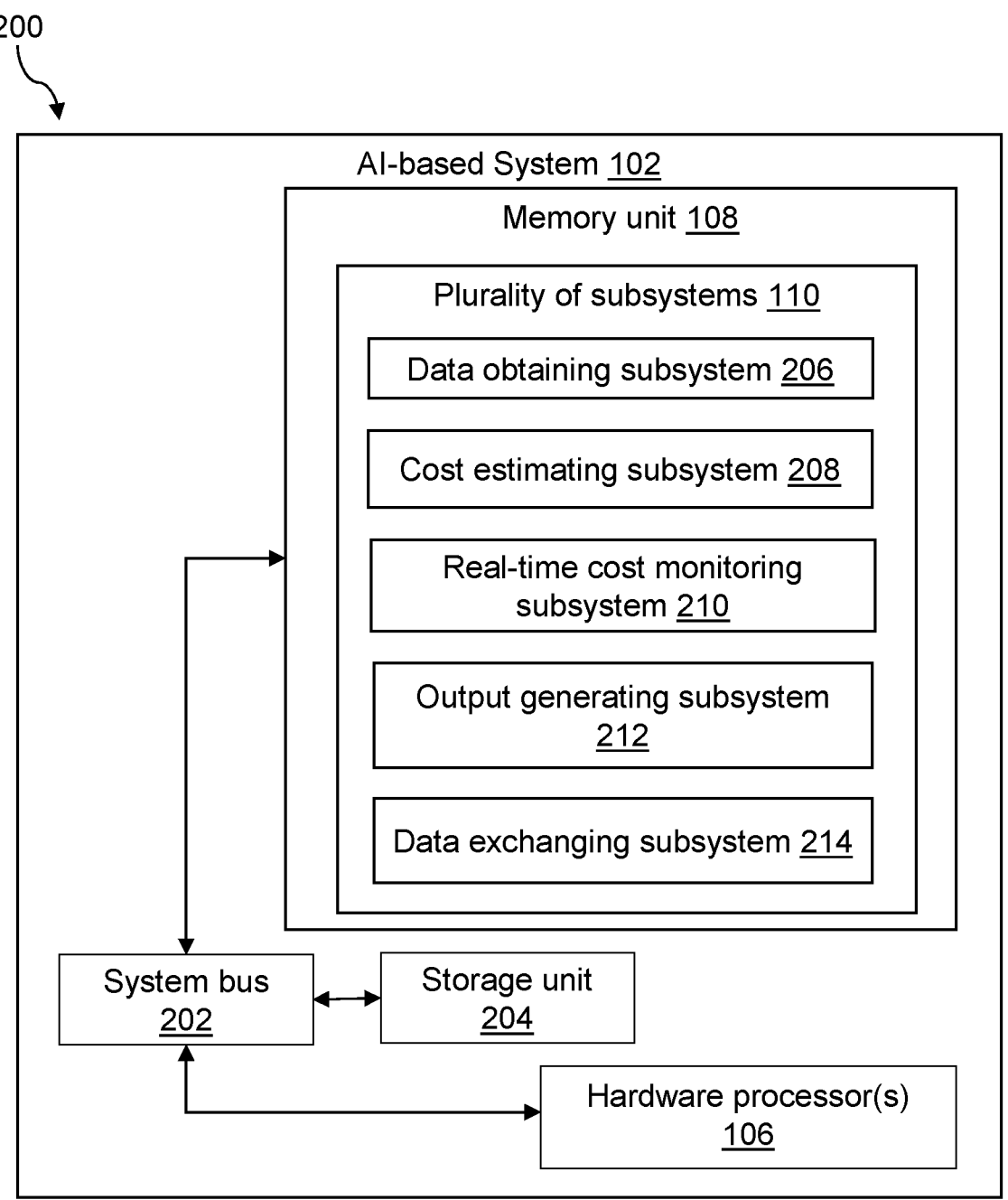
FIG. 2 illustrates a detailed view of the AI-based system, such as those shown in FIG. 1, for adaptively executing the one or more tasks in the one or more AI workflows based on the cost data analysis and budgetary constraints, in accordance with an embodiment of the present disclosure.

FIG. 2 illustrates a detailed view 200 of the AI-based system 102, such as those shown in FIG. 1, for adaptively executing the one or more tasks in the one or more AI workflows based on the cost data analysis and budgetary constraints, in accordance with an embodiment of the present disclosure.

In an exemplary embodiment, the system 102 comprises the one or more servers 104, the memory unit 108, and a storage unit 204. The one or more hardware processors 106, the memory unit 108, and the storage unit 204 are communicatively coupled through a system bus 202 or any similar mechanism. The system bus 202 functions as the central conduit for data transfer and communication between the one or more hardware processors 106, the memory unit 108, and the storage unit 204. The system bus 202 facilitates the efficient exchange of information and instructions, enabling the coordinated operation of the system 102. The system bus 202 may be implemented using various technologies, including but not limited to, parallel buses, serial buses, and high-speed data transfer interfaces such as, but not limited to, at least one of a: universal serial bus (USB), peripheral component interconnect express (PCIe), and similar standards.

In an exemplary embodiment, the memory unit 108 is operatively connected to the one or more hardware processors 106. The memory unit 108 comprises the plurality of subsystems 110 in the form of programmable instructions executable by the one or more hardware processors 106. The plurality of subsystems 110 comprises a data obtaining subsystem 206, a cost estimating subsystem 208, a real-time cost monitoring subsystem 210, an output generating subsystem 212, and a data exchanging subsystem 214.

The one or more hardware processors 106 associated within the one or more servers 104, as used herein, means any type of computational circuit, such as, but not limited to, the microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 106 may also include embedded controllers, such as generic or programmable logic devices or arrays, application-specific integrated circuits, single-chip computers, and the like.

The memory unit 108 may be the non-transitory volatile memory and the non-volatile memory. The memory unit 108 may be coupled to communicate with the one or more hardware processors 106, such as being a computer-readable storage medium. The one or more hardware processors 106 may execute machine-readable instructions and/or source code stored in the memory unit 108. A variety of machine-readable instructions may be stored in and accessed from the memory unit 108. The memory unit 108 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 108 includes the plurality of subsystems 110 stored in the form of machine-readable instructions on any of the above-mentioned storage media and may be in communication with and executed by the one or more hardware processors 106.

The storage unit 204 may be a cloud storage or the one or more databases 116 such as those shown in FIG. 1. The storage unit 204 may store, but not limited to, recommended course of action sequences dynamically generated by the system 102. The action sequences comprise data obtaining, cost estimation, real-time cost monitoring, adaptive task execution, output generation, and the like. Additionally, the storage unit 204 may retain previous action sequences for comparison and future reference, enabling continuous refinement of the system 102 over time. The storage unit 204 may be any kind of database such as, but not limited to, relational databases, dedicated databases, dynamic databases, monetized databases, scalable databases, cloud databases, distributed databases, any other databases, and a combination thereof.

The plurality of subsystems 110 includes the data obtaining subsystem 206 that is communicatively connected to the one or more hardware processors 106. The data obtaining subsystem 206 is configured to obtain the input data including, but not restricted to, at least one of: a monetary value to define an allocated budget (predefined budget), a token quota to limit Artificial Intelligence (AI) token consumption, a computational resource limit to manage processing constraints such as one of: CPU usage and GPU usage, textual inputs provided by the one or more users, expected output size to estimate a response length, Large Language Model (LLM) preference to determine which AI agent of one or more AI agents need be utilized, external tool call parameters, ensuring that Application Programming Interface (API) interactions, retrieval-augmented generation (RAG) steps, and other dependencies are accounted for in a task execution flow, and the like. In an embodiment, the input data may be received from the one or more communication devices 114 associated with the one or more users.

The data obtaining subsystem 206 is a component configured to obtain input data from one or more communication devices 114 associated with one or more users. The input data comprises the monetary value indicating a predefined budget defining a financial limit set by the user for AI task execution (e.g., $50 maximum spend). The token quota defining a limit on the number of tokens (text units) that can be consumed during processing (e.g., 10,000 tokens maximum). The computational resource limit defining constraints on processing power, memory, or time allocated (e.g., 60 seconds maximum inference time). The textual inputs defining the actual text or prompts provided by the user for AI processing (e.g., "Summarize this document"). The expected output size defining the anticipated length or volume of the AI-generated response (e.g., 500-word summary). The preference of one or more language models defining user-specified AI models to be used (e.g., GPT-4 for complex tasks, GPT-3.5 for simpler ones). The retrieval-augmented generation (RAG) steps defining instructions for retrieving external knowledge before generating responses (e.g., search company database before answering customer queries).

The plurality of subsystems 110 further includes the cost estimating subsystem 208 that is communicatively connected to the one or more hardware processors 106. The cost estimating subsystem 208 is configured to compute estimated cost data for each AI workflow of one or more AI workflows using one or more pre-defined pricing models. The cost estimating subsystem 208 is a component configured to compute the estimated cost data for each AI workflow of the one or more AI workflows using the one or more pre-defined pricing models. The estimated cost data represents the projected financial costs computed before and during AI workflow execution. The AI workflow refers to an end-to-end process comprising multiple tasks, LLM calls, RAG steps, and API interactions. The pre-defined pricing models are cost structures that assign at least one of: cost-per-token, cost-per-inference-time unit, and fixed tool call costs, corresponding to each AI workflow. For example, if a user submits a document summarization request, the cost estimating subsystem 208 computes the total cost by applying $0.002 per 1,000 input tokens, $0.004 per 1,000 output tokens, and $0.01 per external API call based on the pre-defined pricing model.

For estimating the estimated cost data for each AI workflow using the one or more pre-defined pricing models, the cost estimating subsystem 208 is further configured to assign at least one of: cost-per-token, cost-per-inference-time unit, and costs fixed tool call, corresponding to each AI workflow of the one or more workflows, using the one or more pre-defined pricing models. The cost estimating subsystem 208 applies specific pricing rates to different types of resource consumption, where cost per token charges based on the number of text units processed, cost per inference time unit charges based on how long the AI model takes to generate a response, and fixed tool call costs are flat fees for using external tools or services, for example, a pricing model might charge $0.002 per 1,000 input tokens, $0.004 per 1,000 output tokens, $0.05 per second of inference time, and $0.01 per external tool call.

The cost estimating subsystem 208 is further configured to analyze the input data to estimate token counts for each AI workflow. The cost estimating subsystem 208 examines the user's text inputs and converts them into token estimates since LLMs process text as tokens rather than words, for example, when a user submits a 500 word document for summarization, the subsystem analyzes the text and estimates it will consume approximately 650 tokens. The cost estimating subsystem 208 is further configured to compute the estimated cost data for at least one of: RAG, Large Language Model (LLM) processing, and one or more tool and Application Programming Interface (API) calls. The cost estimating subsystem 208 computes separate cost projections for each component of the workflow where RAG involves retrieving information from databases, LLM processing involves generating responses using language models, and API calls involve interactions with external services. For example, a customer support query might cost $0.08 for RAG database retrieval, $0.25 for GPT-4 response generation, and $0.05 for CRM API lookup totaling $0.38.

The cost estimating subsystem 208 is further configured to estimate a number of tokens required for task execution, comprising both input and output token counts, for determining LLM inference costs by assessing the input data. The cost estimating subsystem 208 predicts not only how many tokens the user's input contains but also how many tokens the AI will generate in its response since both contribute to total cost, for example, a summarization task with 650 input tokens might generate an estimated 300 output tokens for a total of 950 tokens. The cost estimating subsystem 208 is further configured to provide a breakdown of estimated cost data for one or more components comprising at least one of: cost per token and cost per API call. The cost estimating subsystem 208 presents itemized cost details to users showing exactly where money is being spent across different resources, for example, displaying a breakdown showing Input Tokens:

$0.13, Output Tokens: $0.12, Database Query: $0.08, External API: $0.05, Total Estimated Cost: $0.38.

The cost estimating subsystem 208 is further configured to estimate a cost of sending messages and delegating the one or more tasks for computing the estimated cost data by analyzing at least one of: token counts, processing time, and external API usage, using an inter-agent cost estimation module configured in a cost estimating subsystem 208. When multiple AI agents collaborate on a task, the cost estimating subsystem 208 computes the cost of their communications and task handoffs by analyzing token counts in messages, processing time each agent requires, and any external API usage during delegation. The one or more tasks refer to discrete units of work or operations that are executed within an AI workflow. The one or more tasks are executed within the one or more AI workflows, and the system 102 monitors executed cost data of the one or more tasks in the one or more AI workflows in real-time to dynamically adjust the executed cost data in compliance with the pre-defined budget. For example, when Agent A delegates a subtask to Agent B, the module estimates $0.02 for the 100 token instruction message, $0.15 for Agent B's processing time, and $0.03 for Agent B's external API call totaling $0.20 for that delegation.

In an embodiment, the cost estimation subsystem 208 considers fixed costs such as external tool calls and RAG steps. The cost estimation subsystem 208 calculates the estimated cost data associated with Retrieval-Augmented Generation (RAG), large language model (LLM) processing, and external tool and API calls, ensuring that every aspect of the task execution is considered within the budgetary constraints.

The plurality of subsystems 110 further includes the real-time cost monitoring subsystem 210 that is communicatively connected to the one or more hardware processors 106. The real-time cost monitoring subsystem 210 is configured to monitor the executed cost data of the one or more tasks in the one or more AI workflows in real-time to dynamically adjust the executed cost data of the one or more tasks in the one or more AI workflows in compliance with the pre-defined budget. The executed cost data refers to the actual costs incurred during task execution as they happen, as opposed to estimated costs calculated beforehand. The real-time monitoring means that the real-time cost monitoring subsystem 210 continuously tracks costs as operations occur rather than calculating them after completion.

The dynamic adjustment means the real-time cost monitoring subsystem 210 automatically modifies execution parameters to ensure costs remain within budget limits without requiring manual intervention. For example, if a user sets a $1.00 budget for a document analysis task and the real-time cost monitoring subsystem 210 detects that $0.85 has been spent after processing 70% of the document, it dynamically switches from a high performance LLM to a lower cost LLM for the remaining 30% to ensure the total cost stays within the $1.00 budget.

In an exemplary embodiment, the real-time cost monitoring subsystem 210 is configured to continuously track/monitor and regulate the execution cost data of AI workflows, ensuring adherence to the budget constraints. For monitoring the executed cost data of the one or more tasks in the one or more AI workflows in real-time, the real-time cost monitoring subsystem 210 is further configured to monitor at least one of: token usage, inference time, and tool call execution, corresponding to each AI workflow, in real-time based on the estimated cost data, ensuring adherence to predefined budget. The real-time cost monitoring subsystem 210 continuously tracks actual resource consumption as the AI workflow executes, where token usage measures how many text units are being processed, inference time measures how long the LLM takes to generate responses, and tool call execution tracks external service invocations. For example, during a document summarization task the real-time cost monitoring subsystem 210 tracks that 450 tokens have been consumed, 2.3 seconds of inference time have elapsed, and 2 API calls have been made.

The real-time cost monitoring subsystem 210 is further configured with a decision making module to compare one or more real-time cost metrics associated with the executed cost data of the one or more AI workflows, with the pre-defined budget provided in the input data. The real-time cost monitoring subsystem 210 evaluates current spending against the user's pre-defined budget limit to determine if the workflow is on track financially. For example, if the user set a $1.00 budget and current costs are $0.75 with 60% of the task complete, the decision making module computes that projected total cost would be $1.25 which exceeds the budget.

The real-time cost monitoring subsystem 210 is further configured to determine whether the executed cost data of the one or more tasks in the one or more AI workflows are compliant with the budget constraints based on comparison results, using the decision making module. The real-time cost monitoring subsystem 210 makes a compliance determination by analyzing whether current and projected costs will stay within user's budget limits. For example, the decision making module determines that at the current rate of spending the task will exceed the $1.00 budget by $0.25 and flags this as non-compliant.

The real-time cost monitoring subsystem 210 is further configured to dynamically adjust one or more execution parameters comprising at least one of: LLM selection, token length, and number of reasoning iterations in real-time, to adapt the executed cost data in compliance with the pre-defined budget provided in the input data, using the decision making module. The real-time cost monitoring subsystem 210 automatically modifies how the AI workflow operates to bring costs back within budget, where LLM selection switches between different language models, token length limits the response size, and number of reasoning iterations controls how many thinking steps the AI performs. For example, the decision making module switches from GPT-4 to GPT-3.5 for the remaining 40% of the task, reduces maximum output tokens from 500 to 300, and limits reasoning iterations from 5 to 2, bringing the projected total cost down to $0.95 which is within the $1.00 budget.

For dynamically adjusting the one or more execution parameters to adapt the executed cost data in compliance with the pre-defined budget, the real-time cost monitoring subsystem 210 is configured to select fixed and deterministic execution flow using less expensive, lower-capacity LLMs and minimal reasoning steps, and reducing a number of reasoning cycles and external tool interactions, using the decision making module when the pre-defined budget is low. The fixed and deterministic execution flow refers to a predictable, pre-set sequence of operations that follows a consistent path without dynamic branching or adaptive decision points. The less expensive, lower-capacity LLMs are language models that cost less per token or inference but have reduced capabilities compared to premium models. The minimal reasoning steps means limiting the number of intermediate thinking or chain-of-thought iterations the AI performs. The reasoning cycles are iterative loops where the AI refines its response through multiple passes. The external tool interactions are calls to APIs, databases, or other services outside the core LLM. For example, if a user sets a budget of $0.10 for a question-answering task, the decision making module detects this low budget and automatically selects GPT-3.5 instead of GPT-4, limits reasoning to a single step instead of five chain-of-thought iterations, disables external web search and database lookups, and follows a direct input-to-output flow without intermediate verification steps, thereby completing the task within the $0.10 budget constraint.

The real-time cost monitoring subsystem 210 is further configured to activate a dynamic execution flow that leverages high-performance LLMs, advanced reasoning, and dynamic decision-making, when the pre-defined budget is high. If the real-time cost trends toward exceeding the predefined budget, the decision making module may trigger a shift from a dynamic flow (with advanced reasoning) to a more deterministic fixed flow. The dynamic execution flow refers to an adaptive, flexible sequence of operations that can branch, iterate, and modify its path based on intermediate results and changing conditions. The high-performance LLMs are premium language models with greater capabilities, accuracy, and reasoning power but at higher cost per token. The advanced reasoning involves multi-step chain-of-thought processes, iterative refinement, and complex logical analysis. The dynamic decision-making means the system can adaptively choose different paths, tools, or strategies during execution based on real-time assessments. For example, if a user sets a generous budget of $5.00 for a complex legal document analysis task, the decision making module activates a dynamic execution flow that selects GPT-4 as the high-performance LLM, enables five-step chain-of-thought reasoning with self-verification loops, dynamically decides to invoke external legal database APIs when needed, and iteratively refines the analysis until quality thresholds are met.

The real-time cost monitoring subsystem 210 with the decision making module is further configured to re-estimate remaining budget allocation for subsequent steps through one or more feedback loops. The real-time cost monitoring subsystem 210 with decision making module is further configured to integrate with agent orchestration systems, enabling seamless real-time decision-making across the one or more AI agents. The real-time cost monitoring subsystem 210 continuously re-computes how much budget remains available for upcoming operations based on actual costs incurred so far, where feedback loops allow the system 102 to learn from completed steps and refine estimates for remaining steps. For example, if a multi-step document analysis task has a $2.00 budget and the first two steps consumed $0.80 instead of the estimated $0.60, the decision making module re-estimates the remaining budget as $1.20 and adjusts allocations for the three remaining steps accordingly.

The decision making module enables dynamic selection between one or more execution flows (e.g., fixed vs. dynamic) based on the estimated cost data. The real-time cost monitoring subsystem 210 can switch between different processing paths or strategies during execution depending on current cost projections, where execution flows represent different ways to accomplish the same task with varying cost and performance tradeoffs. For example, if the re-estimated budget shows insufficient funds for the originally planned high-accuracy execution flow, the decision making module dynamically switches to a more economical execution flow that uses fewer reasoning steps and simpler LLM calls.

The real-time cost monitoring subsystem 210 with the decision making module provides historical cost tracking and predictive analytics for better future budgeting, assisting the one or more users in refining budgeting strategies for future AI operations. The real-time cost monitoring subsystem 210 is configured to record all cost data from past executions and uses this historical information to generate predictions and recommendations for future tasks, where historical cost tracking maintains a log of actual costs incurred across different task types and predictive analytics applies statistical or machine learning methods to forecast future costs. For example, after completing 50 document summarization tasks, the decision making module analyzes the historical data and informs the user that similar tasks typically cost between $0.35 and $0.45, recommending a budget of $0.50 for future summarization requests to ensure adequate coverage while minimizing overspending.

The plurality of subsystems 110 further includes the output generating subsystem 212 that is communicatively connected to the one or more hardware processors 106. The output generating subsystem 212 is configured to provide the dynamically adjusted executed cost data, with at least one of: the real-time feedback, the one or more alerts, and the one or more cost reports, as the output, to the one or more users through the one or more user interfaces associated with the one or more communication devices 114 of the one or more users.

The dynamically adjusted executed cost data refers to the actual costs incurred during task execution that have been modified in real-time to comply with budget constraints. The real-time feedback provides immediate suggestions to users about modifying inputs or budgets based on monitored costs. The one or more alerts are notifications triggered when costs approach or exceed budget limits, enabling corrective action. The one or more cost reports are summaries generated before or after workflow execution detailing cost breakdowns. For example, during a document analysis task with a $1.00 budget, the output generating subsystem 212 displays a dashboard showing current spending at $0.75, generates an alert warning the user that 75% of the budget is consumed with 60% of the task complete, and provides a cost report breaking down $0.45 for LLM processing, $0.20 for RAG retrieval, and $0.10 for API calls.

In an exemplary embodiment, the output generating subsystem 212 is configured to generate the real-time feedback for the one or more users provided through the one or more user interfaces associated with the one or more communication devices 114, potentially suggesting one or more modifications to at least one of: the input data and the predefined budget based on the monitored cost data/trends. The real-time feedback refers to immediate, ongoing information delivered to the one or more users as the AI workflow executes rather than after completion. The one or more user interfaces are the visual or interactive platforms such as dashboards, web applications, or mobile apps through which users interact with the system. The modifications to input data means suggested changes to the user's original request such as simplifying the query or reducing output length. The modifications to the pre-defined budget means recommendations to increase the allocated budget if the current budget is insufficient for the requested task. For example, if a user requests a comprehensive market analysis with a $0.50 budget, and the system 102 estimates the task will cost $1.20, the output generating subsystem 212 displays real-time feedback through the user's dashboard suggesting either increasing the budget to $1.25 or simplifying the request to a basic summary that fits within the $0.50 budget.

The output generating subsystem 212 generates the one or more alerts when the costs approach predefined thresholds/budget, allowing the one or more users to take corrective action before budget overruns occur. The one or more alerts are automated notifications triggered when actual spending surpasses or approaches the user's specified budget threshold. The monitored cost data refers to the real-time tracked expenses accumulated during AI workflow execution. The corrective action means user interventions such as stopping the task, increasing the budget, or simplifying the request. The phrase before budget overruns occur indicates the proactive nature of alerts, warning users while there is still time to act. For example, if a user sets a $2.00 budget for a research task and the system 102 detects that $2.10 has been consumed with 80% of the task complete, the output generating subsystem 212 immediately generates an alert notification on the user's dashboard stating "Budget exceeded by $0.10-click to pause task, increase budget, or accept overage" enabling the user to decide whether to stop, allocate additional funds, or proceed.

The output generating subsystem 212 is configured to generate a real-time cost summary or a real-time cost report before the AI workflow is executed. The one or more cost reports are detailed summaries that present projected expenses for the entire AI workflow prior to any processing taking place. The phrase before the one or more AI workflows are executed indicates that the one or more users receive cost visibility upfront, enabling informed decisions about whether to proceed, modify, or cancel the request. This proactive reporting allows the one or more users to approve or adjust budgets before incurring any actual costs. For example, when a user submits a request to analyze 50 customer feedback documents, the output generating subsystem 212 generates a cost report displaying "Estimated Total: $3.75-RAG Retrieval: $0.80, LLM Processing: $2.50, API Calls: $0.45" before any processing begins, allowing the user to approve, reduce scope, or cancel the task.

The output generating subsystem 212 is configured to generate and provide detailed logs that may be used for auditing, optimization, and future cost prediction improvements, enabling better financial planning for subsequent task executions by the one or more AI agents. The one or more logs are detailed records that capture cost data, execution parameters, and resource consumption from each AI workflow execution. Auditing refers to the ability to review and verify past expenditures for compliance and accountability purposes. Optimization means using logged data to identify inefficiencies and improve future cost performance. The future cost prediction improvements refers to refining estimation accuracy by learning from historical actual costs versus estimates. The financial planning for subsequent task executions means using accumulated log data to better allocate budgets for upcoming AI operations. For example, after executing 100 customer support tasks over a month, the output generating subsystem 212 generates logs showing that GPT-4 tasks averaged $0.45 while GPT-3.5 tasks averaged $0.12, enabling the finance team to audit monthly AI spending, optimize by routing simple queries to GPT-3.5, and plan next month's budget based on predicted task volumes.

The plurality of subsystems 110 further includes the data exchanging subsystem 214 that is communicatively connected to the one or more hardware processors 106. The data exchanging subsystem 214 is configured to automatically exchange the estimated cost data during communications between the one or more AI agents, by: (a) offloading the one or more tasks from a first AI agent of the one or more AI agents to a second AI agent possessing lower-cost task executions, and adjusting complexity of a request based on a cumulative cost estimate, (b) adapting a hierarchical cost management where a master AI agent of the one or more AI agents oversees and optimizes overall expenditure across one or more sub-AI agents, and (c) providing dynamic routing of the one or more tasks to a third AI agent possessing cost-effective task executions, to optimize performance and cost.

Regarding offloading the one or more tasks, when one AI agent determines that another agent can perform a task more economically, it transfers the work to that agent and may simplify the request if cumulative costs are high. For example, if Agent A (using GPT-4 at $0.03 per 1K tokens) receives a simple FAQ query, it offloads the task to Agent B (using GPT-3.5 at $0.002 per 1K tokens) and if cumulative costs are approaching budget limits, it adjusts the request from "provide detailed explanation with examples" to "provide brief answer".

Regarding adapting the hierarchical cost management, a central coordinating agent monitors and controls spending across all subordinate agents working on a task. For example, in a document processing pipeline with five sub-agents handling extraction, summarization, translation, formatting, and quality check, the master agent tracks that sub-agents have consumed $1.50 of a $2.00 budget and instructs the remaining agents to use economy mode to stay within budget.

Regarding providing dynamic routing of the one or more tasks, the data exchanging subsystem 214 intelligently directs tasks to whichever agent offers the best balance of cost and capability at any given moment. For example, when a customer support system receives three simultaneous queries, the data exchanging subsystem 214 routes the simple greeting to Agent C (lowest cost), the product question to Agent B (medium cost), and the complex complaint to Agent A (highest cost but best performance), thereby optimizing total expenditure while maintaining appropriate quality for each task type.

FIG. 3 illustrates an exemplary first flow diagram representation 300 depicting the dynamic task execution based on the budgetary constraints, in accordance with an embodiment of the present disclosure.

In an exemplary embodiment, at step 302, the first flow diagram representation 300 starts at a start node. At step 304, the system 102 receives an AI agent call with the input data along with the predefined budget. Following this, at step 306, the system 102 proceeds to estimate the token counts for both input and expected output. The cost estimation subsystem 208 determines the overall costs by computing at least one of: the cost per token, the inference time, and tool and API call costs. At step 308, the system 102 aggregates the estimated total cost for the entire AI workflow, providing a comprehensive view of the expected expenses. At step 310, the decision-making stage is then initiated, where the system 102 checks if the predefined budget is limited. At step 312, if the cost exceeds the predefined budget, the system 102 adjusts the execution plan by selecting a smaller LLM and reducing reasoning iterations to optimize resource utilization while maintaining output quality. At step 316, the selected flow is then executed in a cost-efficient manner. At step 314, if the cost is within the predefined budget, the system 102 proceeds with the full dynamic execution flow, ensuring high performance with advanced reasoning and larger LLMs. At step 318, the system 102 returns the result to the one or more users, ensuring transparency in cost management while optimizing AI execution based on the budget constraints. This structured approach ensures that the system 102 dynamically adapts execution strategies while maintaining cost efficiency and performance balance.

FIG. 4 illustrates an exemplary second flow diagram representation 400 depicting token-based cost data estimation, in accordance with an embodiment of the present disclosure.

In an exemplary embodiment, at step 402, the second flow diagram representation 400 starts at the start node. At step 404, the system 102 receives an AI agent call with text input and the predefined budget. At step 406, the system 102 proceeds to estimate the token counts for both the input and the expected output. At step 408, the cost estimation subsystem 208 determines the overall costs by computing the cost per token, the inference time, and tool and API call fees. At step 410, the system 102 aggregates the cost estimate for the entire AI workflow, providing a comprehensive view of the expected expenses. At step 412, the decision-making stage is then initiated, where the system 102 checks if the estimated cost exceeds the predefined budget (specified budget). At step 414, if the cost exceeds the predefined budget, the system 102 adjusts the execution plan by selecting a smaller LLM and reducing reasoning iterations to optimize resource utilization while maintaining output quality. At step 418, the adjusted plan is then executed in a cost-efficient manner. At step 416, if the cost is within the predefined budget, the system 102 proceeds with the full dynamic execution flow. At step 420, return the result to the one or more users, ensuring transparency in cost management while optimizing AI execution based on the budget constraints. This structured approach ensures that the system 102 dynamically adapts the execution strategies while maintaining the cost efficiency and the performance balance.

Figure 5:
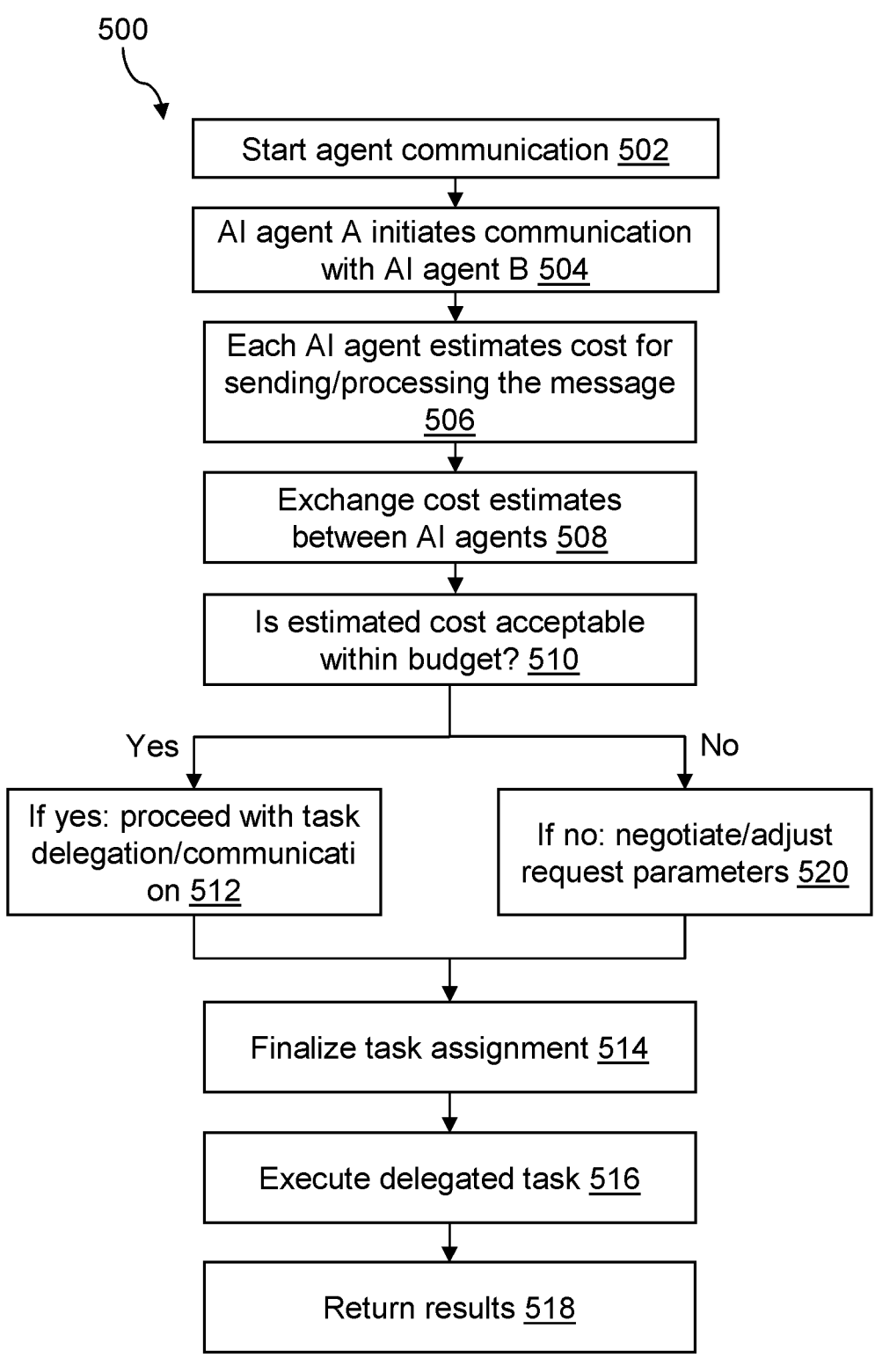
FIG. 5 illustrates an exemplary third flow diagram representation depicting communication between one or more AI agents, in accordance with an embodiment of the present disclosure.

FIG. 5 illustrates an exemplary third flow diagram representation 500 depicting communication between the one or more AI agents, in accordance with an embodiment of the present disclosure.

In an exemplary embodiment, at step 502, the third flow diagram representation 500 begins at a start agent communication stage. At step 504, an AI agent A associated with the one or more AI agents initiates communication with an AI agent B associated with the one or more AI agents. At step 506, each AI agent independently estimates the cost associated with sending and processing the message. Once the costs are determined, at step 508, the one or more AI agents exchange cost estimates, ensuring transparency in resource utilization. At step 510, the system 102 then checks if the estimated cost is acceptable within the predefined budget. At steps 512 and 514, if the cost is within the predefined budget, the system 102 proceeds with task delegation/communication and finalizes task assignment. At step 516, the delegated task is then executed, and at step 518, the results are returned to the one or more users. At step 520, if the cost exceeds the predefined budget, the system 102 enters a negotiation phase, where request parameters are adjusted to meet the budgetary constraints. This adaptive cost-monitoring mechanism ensures that AI agent interactions remain cost-efficient while optimizing task execution and communication dynamics.

The one or more AI agents exchange the estimated costs during inter-agent communications. An initiating AI agent of the one or more AI agents may one of: choose to offload tasks to lower-cost AI agents and adjust the complexity of the request based on the cumulative cost estimate. The system 102 enables hierarchical cost management where a master AI agent of the one or more AI agents oversees and optimizes overall expenditure across sub-AI agents. When the predefined budget is specified, the one or more AI agents collectively ensure that the interactions may not exceed the predefined budget. The system 102 provides dynamic routing of tasks to the most cost-effective AI agent, optimizing both performance and cost.

Figure 6:
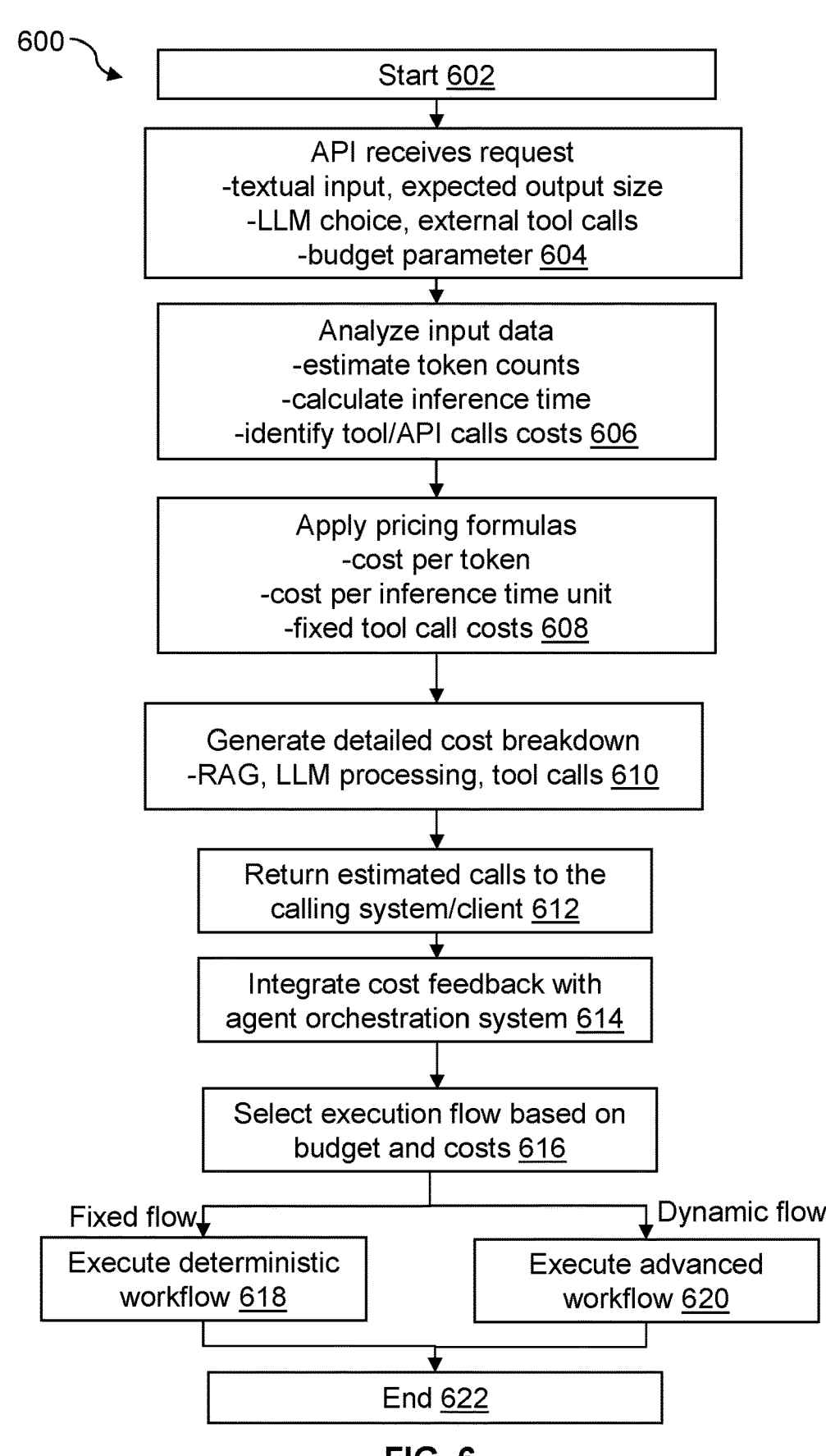
FIG. 6 illustrates an exemplary fourth flow diagram representation depicting the estimation of the cost data for the dynamic task execution, in accordance with an embodiment of the present disclosure.

FIG. 6 illustrates an exemplary fourth flow diagram representation 600 depicting the estimation of the cost data for the dynamic task execution, in accordance with an embodiment of the present disclosure.

In an exemplary embodiment, at step 602, the fourth flow diagram representation 600 begins at start state. At step 604, the API receives the request, including the textual input, the expected output size, the LLM choice, the external tool calls, and budget parameters. At step 606, the system 102 then analyzes the input data, estimating the token counts, calculating the inference time, and identifying the relevant tool and API costs. At step 608, the system 102 applies pricing formulas, computing the cost-per token, the cost-per-inference time unit, and fixed tool call costs. At step 610, a detailed cost breakdown is then generated, covering RAG, LLM processing, and tool calls. At steps 612 and 614, the estimated cost is returned to a calling system/client followed by cost feedback integration with the agent orchestration systems. At steps 616, 618, and 620, the system 102 then selects the task execution flow based on the predefined budget and the cost data, leading to one of: a fixed flow, where a deterministic workflow is executed, and a dynamic flow, where an advanced workflow is executed. At step 622, the process concludes with an end state, ensuring efficient budget-aware execution.

Figure 7:
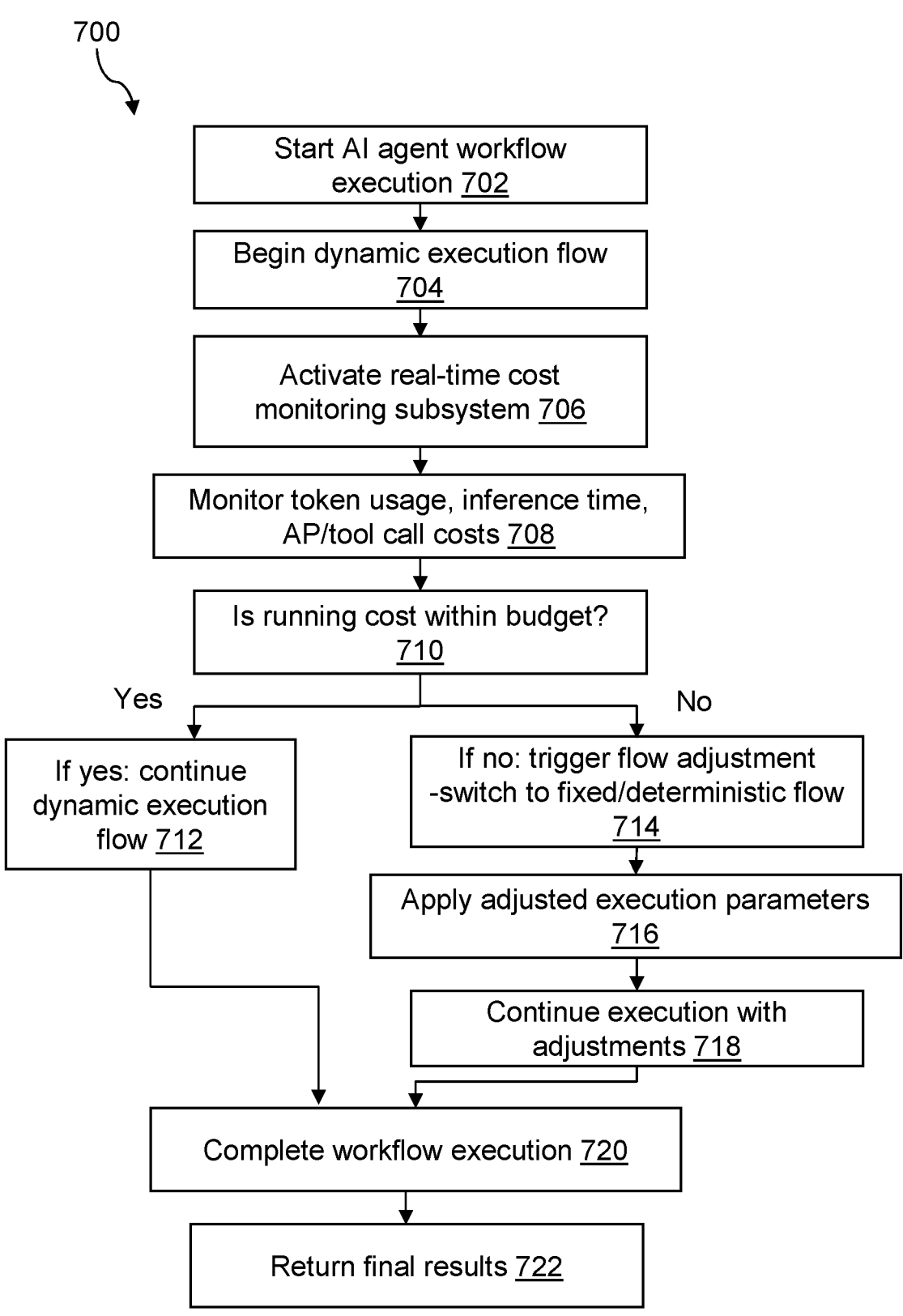
FIG. 7 illustrates an exemplary fifth flow diagram representation depicting the dynamic task execution with real-time cost data monitoring and adjustment, in accordance with an embodiment of the present disclosure.

FIG. 7 illustrates an exemplary fifth flow diagram representation 700 depicting the dynamic task execution with real-time cost data monitoring and adjustment, in accordance with an embodiment of the present disclosure.

In an exemplary embodiment, at steps 702 and 704, the fifth flow diagram representation 700 begins with the start of AI agent workflow execution, followed by initiating a dynamic execution flow. At step 706, the real-time cost monitoring subsystem 210 is then activated. At step 708, the real-time cost monitoring subsystem 210 is configured to track token usage, the inference time, and the API and tool call costs. At step 710, the system 102 then reaches a decision point where the system 102 checks if the running cost is within the predefined budget. At step 712, if the cost is within the predefined budget, the execution proceeds dynamically as planned. At step 714, if the cost exceeds the predefined budget, the system 102 triggers a flow adjustment, switching to a fixed/deterministic execution flow. At step 716, adjusted execution parameters are then applied. At step 718, execution continues with modifications to control the costs. At steps 720 and 722, the workflow execution is then completed, and the final results are returned to the one or more users. This dynamic approach ensures cost efficiency by continuously monitoring and adjusting execution strategies in real time.

FIG. 8A-8B is a flowchart illustrating an AI-based method 800 for adaptively executing the one or more tasks in the one or more AI workflows based on the cost data analysis and budgetary constraints, in accordance with an embodiment of the present disclosure.

At step 802, the input data is obtained from the one or more communication devices 114 associated with the one or more users. The input data may include at least one of: the monetary value indicating a pre-defined budget, the token quota, the computational resource limit, the one or more textual inputs, the expected output size, the preference of one or more language models, and the one or more retrieval-augmented generation (RAG) steps.

At step 804, the estimated cost data for each AI workflow of one or more AI workflows, is estimated using the one or more pre-defined pricing models.

At step 806, the executed cost data of the one or more tasks in the one or more AI workflows, is monitored in real-time to dynamically adjust the executed cost data of the one or more tasks in the one or more AI workflows in compliance with the pre-defined budget. For monitoring the executed cost data of the one or more tasks in the one or more AI workflows in real-time, (a) at least one of: token usage, inference time, and tool call execution, corresponding to each AI workflow, is monitored in real-time based on the estimated cost data, as shown in step 808, (b) the one or more real-time cost metrics associated with the executed cost data of the one or more AI workflows, are compared with the pre-defined budget provided in the input data, using the decision making module, as shown in step 810, (c) the system 102 determines whether the executed cost data of the one or more tasks in the one or more AI workflows are compliant with the budget constraints based on comparison results, using the decision making module, as shown in step 812, and (d) the one or more execution parameters comprising at least one of: LLM selection, token length, and number of reasoning iterations in real-time, are dynamically adjusted to adapt the executed cost data in compliance with the pre-defined budget provided in the input data, using the decision making module, as shown in step 814.

For dynamically adjusting the one or more execution parameters to adapt the executed cost data in compliance with the pre-defined budget, at least one of: (a) fixed and deterministic execution flow are selected using less expensive, lower-capacity LLMs and minimal reasoning steps, and the number of reasoning cycles and external tool interactions, are reduced using the decision making module when the pre-defined budget is low, as shown in step 816, and (b) the dynamic execution flow that leverages high-performance LLMs, advanced reasoning, and dynamic decision-making, is activated when the pre-defined budget is high, as shown in step 818.

In FIG. 8A-8B, the circular symbol with "A" written inside is being used as an off-page connector. This is used for indicating that FIG. 8A continues to the next page as FIG. 8B.

Numerous advantages of the present disclosure may be apparent from the discussion above. In accordance with the present disclosure, the system 102 for the dynamic task execution based on the cost data analysis and the budgetary constraints is disclosed. The system 102 adapts execution based on the predefined budget. The system 102 monitors execution costs continuously and automatically adjusts the AI workflows. The system 102 ensures that the one or more AI agents negotiate and allocate resources efficiently. The system 102 switches between execution modes based on affordability and performance needs. The cost estimating subsystem 208 integrates with existing AI frameworks, providing cost feedback before execution, reducing surprises in billing. The system 102 enables predictive cost analysis and historical cost tracking for better decision-making. Overall, the system 102 optimizes AI execution by reducing the costs, improving predictability, and ensuring AI workflows align with the budget constraints.

The system 102 dynamically selects fixed (low-cost) and dynamic (high-performance) execution flows based on the budget constraints. The system 102 enables multi-agent cost-aware communication, ensuring that the one or more AI agents collaborate within the predefined budget. The system 102 provides the cost estimation API to integrate budgeting into the AI workflows. The system 102 implements real-time cost monitoring and adjustment, switching execution modes to prevent exceeding the predefined budgets.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/ W) and DVD.

Input/output (I/O) devices (including but not limited to keyboards, displays, pointing devices, etc.) can be coupled to the system 102 either directly or through intervening I/O controllers. Network adapters may also be coupled to the system 102 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/system 102 in accordance with the embodiments herein. The system 102 herein comprises at least one processor or central processing unit (CPU). The CPUs are interconnected via the system bus 202 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the system 102. The system 102 can read the inventive instructions on the program storage devices and follow these instructions to execute the methodology of the embodiments herein.

The system 102 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/ article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising", "having", "containing", and "including", and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a", "an", and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. An artificial intelligence (AI)-based method for adaptively executing one or more tasks based on cost analysis and budgetary constraints, the AI-based method comprising:

obtaining, by one or more hardware processors, input data from one or more communication devices associated with one or more users, wherein the input data comprise at least one of: a monetary value indicating a pre-defined budget, a token quota, a computational resource limit, one or more textual inputs, an expected output size, preference of one or more language models, and one or more retrieval-augmented generation (RAG) steps;

computing, by the one or more hardware processors, estimated cost data for each AI workflow of one or more AI workflows using one or more pre-defined pricing models;

monitoring, by the one or more hardware processors, executed cost data of the one or more tasks in the one or more AI workflows in real-time to dynamically adjust the executed cost data of the one or more tasks in the one or more AI workflows in compliance with the pre-defined budget, wherein monitoring the executed cost data of the one or more tasks in the one or more AI workflows in real-time, comprises:

monitoring, by the one or more hardware processors, at least one of: token usage, inference time, and tool call execution, corresponding to each AI workflow, in real-time based on the estimated cost data;

comparing, by the one or more hardware processors, one or more real-time cost metrics associated with the executed cost data of the one or more AI workflows, with the pre-defined budget provided in the input data, using a decision making module;

determining, by the one or more hardware processors, whether the executed cost data of the one or more tasks in the one or more AI workflows are compliant with the budget constraints based on comparison results, using the decision making module; and dynamically adjusting, by the one or more hardware processors, one or more execution parameters comprising at least one of: LLM selection, token length, and number of reasoning iterations in real-time, to adapt the executed cost data in compliance with the pre-defined budget provided in the input data, using the decision making module, wherein dynamically adjusting the one or more execution parameters to adapt the executed cost data in compliance with the pre-defined budget, comprises at least one of:

selecting, by the one or more hardware processors, fixed and deterministic execution flow using less expensive, lower-capacity LLMs and minimal reasoning steps, and reducing a number of reasoning cycles and external tool interactions, using the decision making module when the pre-defined budget is low; and activating, by the one or more hardware processors, a dynamic execution flow that leverages high-performance LLMs, advanced reasoning, and dynamic decision-making when the pre-defined budget is high.

2. The AI-based method of claim 1, wherein computing the estimated cost data for each AI workflow using the one or more pre-defined pricing models, comprises:

assigning, by the one or more hardware processors, at least one of: cost-per-token, cost-per-inference-time unit, and costs fixed tool call, corresponding to each AI workflow of the one or more workflows, using the one or more pre-defined pricing models;

analyzing, by the one or more hardware processors, the input data to estimate token counts for each AI workflow;

computing, by the one or more hardware processors, the estimated cost data for at least one of: RAG, Large Language Model (LLM) processing, and one or more tool and Application Programming Interface (API) calls;

estimating, by the one or more hardware processors, a number of tokens required for task execution, comprising both input and output token counts, for determining LLM inference costs by assessing the input data;

providing, by the one or more hardware processors, a breakdown of estimated cost data for one or more components comprising at least one of: cost per token and cost per API call; and estimating, by the one or more hardware processors, a cost of sending messages and delegating the one or more tasks for computing the estimated cost data by analyzing at least one of: token counts, processing time, and external API usage, using an inter-agent cost estimation module configured in a cost estimating subsystem.

3. The AI-based method of claim 1, further comprising providing, by the one or more hardware processors, the dynamically adjusted executed cost data, with at least one of: real-time feedback, one or more alerts, and one or more cost reports, as an output, to the one or more users through one or more user interfaces associated with the one or more communication devices of the one or more users.

4. The AI-based method of claim 1, further comprising:

re-estimating, by the one or more hardware processors, remaining budget allocation for one or more subsequent steps using the decision making module through one or more feedback loops;

adapting, by the one or more hardware processors, dynamic selection between one or more execution flows based on the estimated cost data, using the decision-making module; and providing, by the one or more hardware processors, historical cost tracking and predictive analytics for future budgeting to assist the one or more users in refining budgeting strategies for future AI operations, using the decision making module.

5. The AI-based method of claim 3, further comprising at least one of:

generating, by the one or more hardware processors, the real-time feedback for the one or more users provided through the one or more user interfaces associated with the one or more communication devices, potentially suggesting one or more modifications to at least one of: the input data and the predefined budget based on the monitored cost data;

generating, by the one or more hardware processors, the one or more alerts when the monitored cost data exceeds the pre-defined budget, adapting the one or more users to take corrective action before budget overruns occur;

generating, by the one or more hardware processors, the one or more cost reports before the one or more AI workflows are executed; and generating, by the one or more hardware processors, one or more logs associated with the one or more cost reports for auditing, optimization, and future cost prediction improvements, adapting financial planning for one or more subsequent task executions by one or more AI agents.

6. The AI-based method of claim 1, further comprising automatically exchanging, by the one or more hardware processors, the estimated cost data during communications between the one or more AI agents, by:

offloading, by the one or more hardware processors, the one or more tasks from a first AI agent of the one or more AI agents to a second AI agent possessing lower-cost task executions, and adjusting complexity of a request based on a cumulative cost estimate;

adapting, by the one or more hardware processors, a hierarchical cost management where a master AI agent of the one or more AI agents oversees and optimizes overall expenditure across one or more sub-AI agents; and providing, by the one or more hardware processors, dynamic routing of the one or more tasks to a third AI agent possessing cost-effective task executions, to optimize performance and cost.

7. An artificial intelligence (AI)-based system for adaptively executing one or more tasks based on cost analysis and budgetary constraints, the AI-based system comprising:

one or more hardware processors; and a memory coupled to the one or more hardware processors, wherein the memory comprises a plurality of subsystems in form of programmable instructions executable by the one or more hardware processors, and wherein the plurality of subsystems comprises:

a data obtaining subsystem configured to obtain input data from one or more communication devices associated with one or more users, wherein the input data comprise at least one of: a monetary value indicating a pre-defined budget, a token quota, a computational resource limit, one or more textual inputs, an expected output size, preference of one or more language models, and one or more retrieval-augmented generation (RAG) steps;

a cost estimating subsystem configured to compute estimated cost data for each AI workflow of one or more AI workflows using one or more pre-defined pricing models;

a real-time cost monitoring subsystem configured to monitor executed cost data of the one or more tasks in the one or more AI workflows in real-time to dynamically adjust the executed cost data of the one or more tasks in the one or more AI workflows in compliance with the pre-defined budget, wherein in monitoring the executed cost data of the one or more tasks in the one or more AI workflows in real-time, the real-time cost monitoring subsystem is further configured to:

monitor at least one of: token usage, inference time, and tool call execution, corresponding to each AI workflow, in real-time based on the estimated cost data;

compare one or more real-time cost metrics associated with the executed cost data of the one or more AI workflows, with the pre-defined budget provided in the input data, using a decision making module;

determine whether the executed cost data of the one or more tasks in the one or more AI workflows are compliant with the budget constraints based on comparison results, using the decision making module; and dynamically adjust one or more execution parameters comprising at least one of: LLM selection, token length, and number of reasoning iterations in real-time, to adapt the executed cost data in compliance with the pre-defined budget provided in the input data, using the decision making module, and wherein in dynamically adjusting the one or more execution parameters to adapt the executed cost data in compliance with the pre-defined budget, the real-time cost monitoring subsystem is configured to at least one of:

select fixed and deterministic execution flow using less expensive, lower-capacity LLMs and minimal reasoning steps, and reducing a number of reasoning cycles and external tool interactions, using the decision making module when the pre-defined budget is low; and activate a dynamic execution flow that leverages high-performance LLMs, advanced reasoning, and dynamic decision-making, when the pre-defined budget is high.

8. The AI-based system of claim 7, wherein in computing the estimated cost data for each AI workflow using the one or more pre-defined pricing models, the cost estimating subsystem is further configured to:

assign at least one of: cost-per-token, cost-per-inference-time unit, and costs fixed tool call, corresponding to each AI workflow of the one or more workflows, using the one or more pre-defined pricing models;

analyze the input data to estimate token counts for each AI workflow;

compute the estimated cost data for at least one of: RAG, Large Language Model (LLM) processing, and one or more tool and Application Programming Interface (API) calls;

estimate a number of tokens required for task execution, comprising both input and output token counts, for determining LLM inference costs by assessing the input data;

provide a breakdown of estimated cost data for one or more components comprising at least one of: cost per token and cost per API call; and estimate a cost of sending messages and delegating the one or more tasks for computing the estimated cost data by analyzing at least one of: token counts, processing time, and external API usage, using an inter-agent cost estimation module configured in the cost estimating subsystem.

9. The AI-based system of claim 7, further comprising an output generating subsystem configured to provide the dynamically adjusted executed cost data, with at least one of: real-time feedback, one or more alerts, and one or more cost reports, as an output, to the one or more users through one or more user interfaces associated with the one or more communication devices of the one or more users.

10. The AI-based system of claim 7, wherein the real-time cost monitoring subsystem is further configured to:

re-estimate remaining budget allocation for one or more subsequent steps using the decision making module through one or more feedback loops;

adapt dynamic selection between one or more execution flows based on the estimated cost data, using the decision-making module; and provide historical cost tracking and predictive analytics for future budgeting to assist the one or more users in refining budgeting strategies for future AI operations, using the decision making module.

11. The AI-based system of claim 9, wherein the output generating subsystem is further configured to at least one of:

generate the real-time feedback for the one or more users provided through the one or more user interfaces associated with the one or more communication devices, potentially suggesting one or more modifications to at least one of: the input data and the predefined budget based on the monitored cost data;

generate the one or more alerts when the monitored cost data exceeds the pre-defined budget, adapting the one or more users to take corrective action before budget overruns occur;

generate the one or more cost reports before the one or more AI workflows are executed; and generate one or more logs associated with the one or more cost reports for auditing, optimization, and future cost prediction improvements, adapting financial planning for one or more subsequent task executions by one or more AI agents.

12. The AI-based system of claim 7, further comprising a data exchanging subsystem configured to automatically exchange the estimated cost data during communications between the one or more AI agents, by:

offloading the one or more tasks from a first AI agent of the one or more AI agents to a second AI agent possessing lower-cost task executions, and adjusting complexity of a request based on a cumulative cost estimate;

adapting a hierarchical cost management where a master AI agent of the one or more AI agents oversees and optimizes overall expenditure across one or more sub-AI agents; and providing dynamic routing of the one or more tasks to a third AI agent possessing cost-effective task executions, to optimize performance and cost.

13. A non-transitory computer-readable storage medium having instructions stored therein that when executed by one or more hardware processors, cause the one or more hardware processors to execute operations of:

obtaining input data from one or more communication devices associated with one or more users, wherein the input data comprise at least one of: a monetary value indicating a pre-defined budget, a token quota, a computational resource limit, one or more textual inputs, an expected output size, preference of one or more language models, and one or more retrieval-augmented generation (RAG) steps;

computing estimated cost data for each AI workflow of one or more AI workflows using one or more pre-defined pricing models;

monitoring executed cost data of one or more tasks in the one or more AI workflows in real-time to dynamically adjust the executed cost data of the one or more tasks in the one or more AI workflows in compliance with the pre-defined budget, wherein monitoring the executed cost data of the one or more tasks in the one or more AI workflows in real-time, comprises:

monitoring at least one of: token usage, inference time, and tool call execution, corresponding to each AI workflow, in real-time based on the estimated cost data;

comparing one or more real-time cost metrics associated with the executed cost data of the one or more AI workflows, with the pre-defined budget provided in the input data, using a decision making module;

determining, by the one or more hardware processors, whether the executed cost data of the one or more tasks in the one or more AI workflows are compliant with the budget constraints based on comparison results, using the decision making module; and dynamically adjusting, by the one or more hardware processors, one or more execution parameters comprising at least one of: LLM selection, token length, and number of reasoning iterations in real-time, to adapt the executed cost data in compliance with the pre-defined budget provided in the input data, using the decision making module, and wherein dynamically adjusting the one or more execution parameters to adapt the executed cost data in compliance with the pre-defined budget, comprises at least one of:

selecting, by the one or more hardware processors, fixed and deterministic execution flow using less expensive, lower-capacity LLMs and minimal reasoning steps, and reducing a number of reasoning cycles and external tool interactions, using the decision making module when the pre-defined budget is low; and activating, by the one or more hardware processors, a dynamic execution flow that leverages high-performance LLMs, advanced reasoning, and dynamic decision-making when the pre-defined budget is high.

14. The non-transitory computer-readable storage medium of claim 13, wherein computing the estimated cost data for each AI workflow using the one or more pre-defined pricing models, comprises:

assigning at least one of: cost-per-token, cost-per-inference-time unit, and costs fixed tool call, corresponding to each AI workflow of the one or more workflows, using the one or more pre-defined pricing models;

analyzing the input data to estimate token counts for each AI workflow;

computing the estimated cost data for at least one of: RAG, Large Language Model (LLM) processing, and one or more tool and Application Programming Interface (API) calls;

estimating a number of tokens required for task execution, comprising both input and output token counts, for determining LLM inference costs by assessing the input data;

providing a breakdown of estimated cost data for one or more components comprising at least one of: cost per token and cost per API call; and estimating a cost of sending messages and delegating the one or more tasks for computing the estimated cost data by analyzing at least one of: token counts, processing time, and external API usage, using an inter-agent cost estimation module configured in a cost estimating subsystem.

15. The non-transitory computer-readable storage medium of claim 13, further comprising providing the dynamically adjusted executed cost data, with at least one of: real-time feedback, one or more alerts, and one or more cost reports, as an output, to the one or more users through one or more user interfaces associated with the one or more communication devices of the one or more users.

16. The non-transitory computer-readable storage medium of claim 13, further comprising:

re-estimating remaining budget allocation for one or more subsequent steps using the decision making module through one or more feedback loops;

adapting dynamic selection between one or more execution flows based on the estimated cost data, using the decision-making module; and providing historical cost tracking and predictive analytics for future budgeting to assist the one or more users in refining budgeting strategies for future AI operations, using the decision making module.

17. The non-transitory computer-readable storage medium of claim 15, further comprising at least one of:

generating the real-time feedback for the one or more users provided through the one or more user interfaces associated with the one or more communication devices, potentially suggesting one or more modifications to at least one of: the input data and the predefined budget based on the monitored cost data;

generating the one or more alerts when the monitored cost data exceeds the pre-defined budget, adapting the one or more users to take corrective action before budget overruns occur;

generating the one or more cost reports before the one or more AI workflows are executed; and generating one or more logs associated with the one or more cost reports for auditing, optimization, and future cost prediction improvements, adapting financial planning for one or more subsequent task executions by one or more AI agents.

18. The non-transitory computer-readable storage medium of claim 13, further comprising automatically exchanging the estimated cost data during communications between the one or more AI agents, by:

offloading the one or more tasks from a first AI agent of the one or more AI agents to a second AI agent possessing lower-cost task executions, and adjusting complexity of a request based on a cumulative cost estimate;

adapting a hierarchical cost management where a master AI agent of the one or more AI agents oversees and optimizes overall expenditure across one or more sub-AI agents; and providing dynamic routing of the one or more tasks to a third AI agent possessing cost-effective task executions, to optimize performance and cost.

\* \* \* \* \*